Jan. 24, 1933.  S. F. SPANGLER  1,895,012
NITRIC ACID CONCENTRATION
Filed May 16, 1930  2 Sheets-Sheet 1

INVENTOR
Samuel F. Spangler
BY
Cavanagh & James
ATTORNEYS

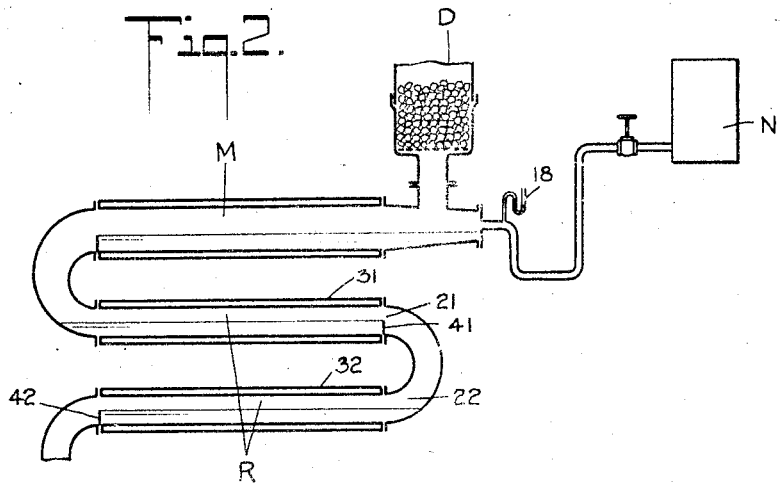
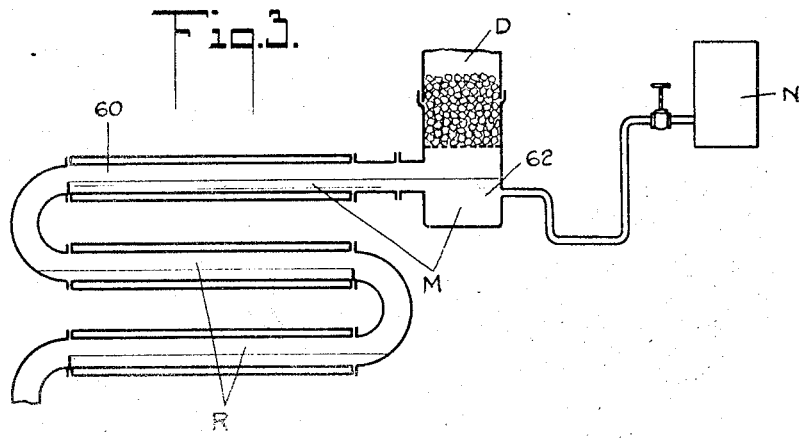

Patented Jan. 24, 1933

1,895,012

UNITED STATES PATENT OFFICE

SAMUEL F. SPANGLER, OF PHILADELPHIA, PENNSYLVANIA, ASSIGNOR TO CHEMICAL CONSTRUCTION CORPORATION, OF CHARLOTTE, NORTH CAROLINA, A CORPORATION OF DELAWARE

NITRIC ACID CONCENTRATION

Application filed May 16, 1930. Serial No. 452,903.

This invention relates to nitric acid concentration, and more particularly to a method and means for the concentration of nitric acid by the use of a dehydrating agent such as sulphuric acid.

In a copending application of Ingenuin Hechenbleikner and the present applicant, Serial No. 450,912 filed May 9, 1930, a nitric acid concentration system is disclosed in which the dilute nitric acid to be concentrated is mixed with sulphuric acid in an unheated mixer tube, after which the mixture of nitric and sulphuric acids is passed through a plurality of heated retort tubes or pipes. The water content of the nitric acid is in the main removed by the sulphuric acid, and such water vapor as may incidentally be distilled off with the nitric acid vapor is removed from the nitric acid vapor in a dehydrating tower.

I have found that to insure uniform operation of such a concentration system it is necessary that the nitric and sulphuric acids be thoroughly mixed and not permitted to stratify in layers. Accordingly, to accomplish thorough mixing of the acids is a primary object of my invention, and this I have found may be done by mixing the dilute nitric acid with the sulphuric acid in large volumes. In accordance with my invention, a mixing chamber is provided which, different from the practice set forth in the aforesaid copending application, is substantially greater in volume than one of the retort tubes. The mixer tube or chamber employed in the apparatus of said copending application is unheated. A further object of the present invention is to make it feasible not only to thoroughly mix the acids in a mixer chamber, but also to heat at least a portion of the mixer chamber in order to increase the operating capacity of the plant. To fulfill this object of my invention the flow of nitric acid vapor from the retort tubes to the dehydrating tower is facilitated, as by increasing the cross sectional area of the flow space provided for the passage of such vapor, or by providing independent flow connections, first, between the retort tubes and the dehydrating tower, and, second, between the heated mixer tubes and the dehydrating tower.

To the accomplishment of the foregoing and such other objects as will hereinafter appear, my invention consists in the nitric acid concentration method and apparatus elements and their relation one to the other, as hereinafter are more particularly described and sought to be defined in the claims. The specification is accompanied by drawings which show the preferred embodiments of my invention, and in which:

Fig. 2 is a portion of Fig. 1 showing a modified form of my invention; and

Fig. 3 is a portion of Fig. 1 showing still another modification of the invention.

Figure 1:
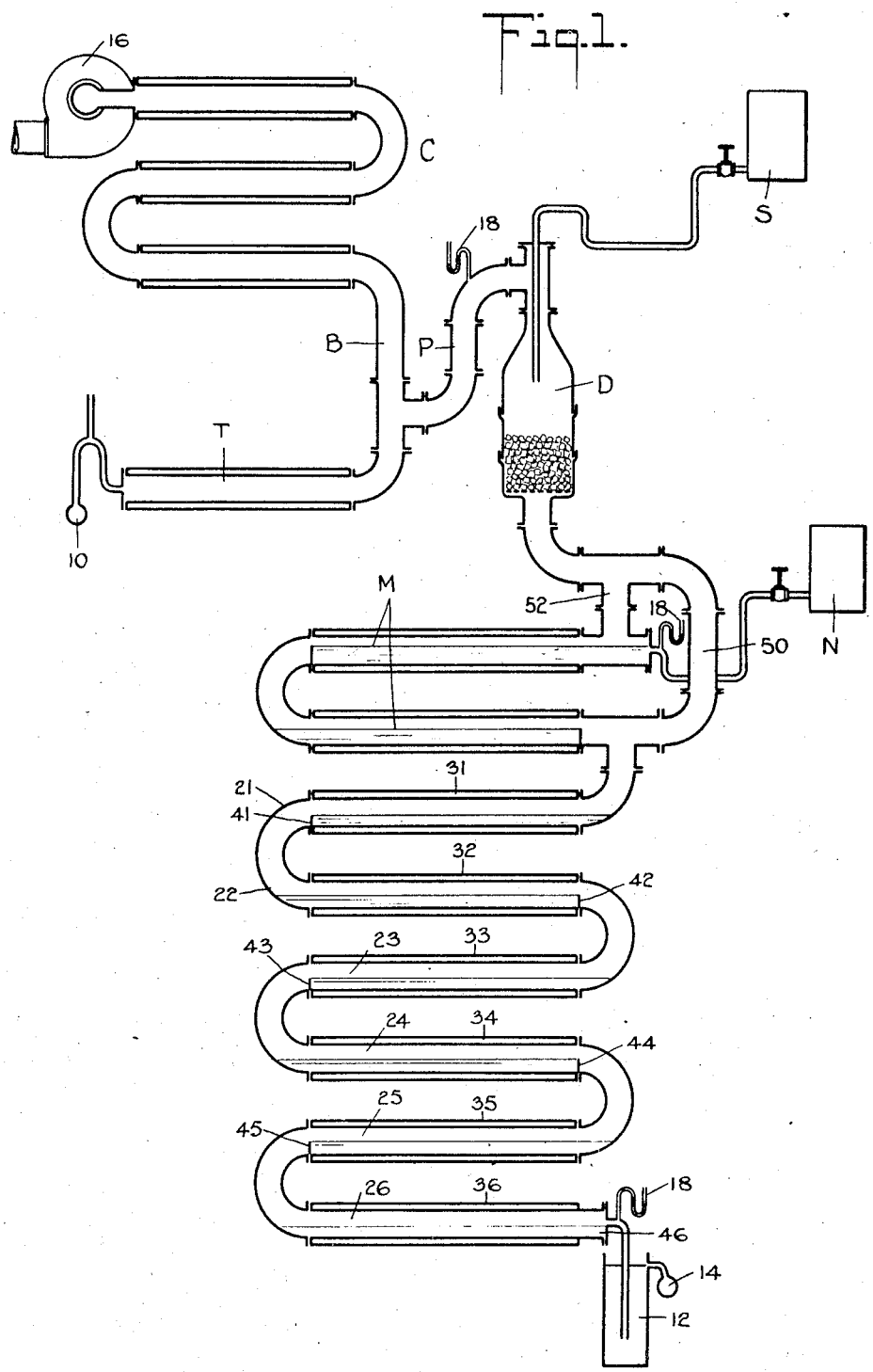
Fig. 1 is a schematic flow diagram of a nitric acid concentration system embodying my invention.

Referring to the drawings, and more particularly to the complete flow diagram shown in Fig. 1, a dehydrating agent, preferably sulphuric acid, flows from a tank S downwardly through a dehydrating tower D and thence into a mixer chamber M. The dilute nitric acid to be concentrated flows from a tank N into the heated mixer chamber M at a point below the packing of the dehydrating tower D, and in the mixer chamber M the dilute nitric acid is mixed with the sulphuric acid. The acid mixture flows downwardly through a vertically superposed bank of retort tubes R heated by individual steam jackets. Separate bodies of acid mixture of different strengths are retained in the retort tubes by dams located at the discharge ends thereof, as is schematically shown in the drawings.

Nitric acid vapor is evolved from the acid mixture in the retort and mixer tubes and the water content of the dilute nitric acid is, for the most part, retained by the sulphuric acid. The nitric acid vapor along with some water vapor incidentally evolved therewith flows upward through the retort tubes and upward through the mixer tubes and thence to the dehydrating tower D. During its passage upward through the tower the water vapor is removed by the descending sulphuric acid. The dehydrated nitric acid vapor flows from the top of the tower downwardly through pipe P and then upwardly through a bleacher pipe B and into a bank of water-jacketed condenser tubes C in which the nitric acid vapor is condensed to a liquid which flows back down through the bleacher pipe B. During the descent of liquefied concentrated nitric acid through the bleacher pipe B the acid is bleached or purified principally by the abstraction of oxides of nitrogen therefrom by the rising nitric acid vapor. From the bleacher pipe the concentrated nitric acid flows into a water-jacketed collecting tube T from which the acid is led through a pipe 10 to any suitable storage tank.

The sulphuric acid leaving the retort tubes R, diluted by the acquisition of water, flows into a cooler 12 from which it is led through a pipe 14 to any conventional concentractor, after which it is returned to the sulphuric acid supply tank S. A suction fan 16 is preferably provided at the outlet of the condenser C in order to draw undissolved oxides of nitrogen together with air which may have leaked into the system out of the retort tubes, mixer chamber, dehydrator and condenser. The fan exhaust may, if desired, be led to one of the absorption towers in which artifically manufactured oxides of nitrogen are initially absorbed to manufacture the dilute nitric acid which eventually is concentrated by the apparatus of the present invention. The fan 16 maintains a slight vacuum throughout the concentrator system which aids in the desired distillation of nitric acid vapor in the retort and mixer tubes, and, consequently, the pressure in the system, as indicated by the monometers 18, should preferably be at least slightly negative.

The arrangement so far described corresponds generally with that disclosed in the copending application before mentioned, and in the present arrangement, as in that arrangement, it is preferable that each of the retort tubes 21, 22, 23, 24, 25 and 26 be provided with independent heating means, here exemplified by the steam jackets 31, 32, 33, 34, 35 and 36, which should preferably be fed with steam through independent pipes so as to make possible temperature control in each of the tubes so as to obtain the proper temperature for optimum yield. It will be understood that electrical heating, either by resistance or induction, may equally well be employed.

Each of the tubes is provided at its discharge end with a dam 41, 42, 43, 44, 45 and 46 for establishing the liquid level in the tubes, and these should preferably be readily interchangeable or adjustable so that the liquid level in each of the tubes may be determined independently of that in the other tubes. In general, it is found that the level in the upper tubes should be lower than that in the lower tubes in order to increase the space provided above the liquid for the flow of the cumulatively increasing acid vapor.

The present arrangement differs from that disclosed in the aforesaid copending application, firstly, in that a mixer chamber M is provided having a volume substantially greater than that of a retort tube. This increased volume is obtained partially by the utilization of two tubes instead of one for the mixer chamber, but, even more importantly, and regardless of whether one or two tubes are used, the increased volume is obtained by establishing a relatively high liquid level in the mixer tubes. The present arrangement improves upon the prior system, secondly, in the provision of steam jackets or similar heating means for heating the mixer chamber so that the mixer chamber itself may be used to promote the evolution of nitric acid vapor. Either or both of these features would, in the prior system, too greatly diminish the vapor space above the liquid.

In accordance with the present invention these difficulties are overcome by the provision of a bypass connection 50 which facilitates the passage of nitric acid vapor from the retort tubes R directly to the dehydrating tower D. The nitric acid vapor evolved in the heated mixer chamber is conducted to the dehydrating tower D by an independent connection 52 which also serves to guide the sulphuric acid descending from the tank S into the mixer chamber M where it is mixed with the dilute nitric acid entering the mixer chamber M from the tank N. The provision of the bypass connection 50 and its relation to the connection 52 constitutes a third important distinction between the present arrangement and that disclosed in the aforesaid copending application.

The general principles relating to the provision, first, of ample mixing volume, second, of means to heat the mixer chamber, and, third, of means to facilitate the flow of nitric acid vapor from the retort tubes to the dehydrating tower, may be applied by apparatus differing from that previously described, and a modified arrangement is shown in Fig. 2. This arrangement employs only a single mixer tube M for the mixer chamber but the diameter of this tube is substantially greater than that of the retort tubes R. In consequence of this, a volume of acid amply sufficient to insure thorough mixing of the sulphuric and nitric acids may readily be provided without necessitating a high liquid level in the tube. It therefore follows that the large mixer tube M may be heated to cause an evolution of nitric acid vapor, and it further follows that the large flow space provided above the liquid in the mixer tube is well adapted to facilitate the free transmission of all of the nitric acid vapor previously evolved, and that additionally evolved, in the mixer chamber upward into the dehydrating tower D.

Still another structural arrangement for the practice of my invention is illustrated in Fig. 3, in which the mixer chamber M consists partially of a heated tube 60 and partially of an unheated chamber 62, most conveniently obtained by utilizing the bottom of the dehydrating tower D. In this arrangement the mixer chamber has a volume far greater than that of the liquid content in a retort tube and, in consequence, thorough mixing and absence of stratification into layers of the nitric and sulphuric acids is insured. With this arrangement the tube 60 may be heated or left unheated, as desired. If unheated, the arrangement improves upon the prior arrangement in providing augmented mixer chamber volume. If heated, additional advantage is obtained in the further utilization of tube surface. The liquid level in the tube 60 is kept relatively low in order to provide ample space above the liquid for the free flow of the entire nitric acid vapor output of the retort system. This lowering of the level of the acid mixture in tube 60 is not deleterious because the mixer chamber volume available is sufficient to insure thorough mixing due to the auxiliary chamber 62.

The arrangements disclosed in Figs. 1 and 3 have the advantage over that disclosed in Fig. 2 of employing uniform pipes, jackets and fittings throughout the system, which simplifies the problem of replacement and of providing spare parts for maintenance. However, in any case where two sizes of pipes and fittings are anyway available due to requirements at other points in the manufacturing plant, the arrangement illustrated in Fig. 2 may prove desirable.

The method of my invention, the mode of constructing suitable apparatus for the practice of the same, and the many advantages of the invention, will, it is believed, be apparent from the foregoing description thereof. The details of the operation of the entire concentration system have not been set forth because these, for the most part, coincide with the disclosure of the copending application previously identified, and the present system, except in the particulars previously outlined in detail, does not affect the operation there described. In the present arrangement thorough mixing of the nitric and sulphuric acids is insured, heating surface is conserved, thereby increasing the plant capacity, and the transfer of nitric acid vapor from the retort tubes and from the mixer chamber to the dehydrating tower is facilitated.

It will be apparent that while I have shown and described my invention in the preferred forms, many changes and modifications may be made in the structures disclosed without departing from the spirit of the invention, defined in the following claims.

I claim:

1. In the operation of a nitric acid concentrator comprising a series of heated retort tubes, the method which includes mixing the dilute nitric acid with sulphuric acid in a body of liquid having a volume substantially greater than that of the liquid content in a retort tube in order to insure thorough mixing of the acids, and passing the resulting acid mixture through the retort tubes.

2. In the operation of a nitric acid concentrator comprising a series of heated retort tubes, the method which includes mixing the dilute nitric acid with sulphuric acid in a body of liquid having a volume substantially greater than that of the liquid content in a retort tube in order to insure thorough mixing of the acids, externally heating at least a portion of the initially mixed nitric and sulphuric acids, and passing the resulting acid mixture through the retort tubes.

3. In the operation of a nitric acid concentrator comprising a series of heated retort tubes and a dehydrating tower, the method which includes mixing the dilute nitric acid with sulphuric acid in a body of liquid having a volume substantially greater than that of the liquid content in a retort tube, externally heating at least a portion of the initially mixed nitric and sulphuric acids, passing the resulting acid mixture through the retort tubes, and conducting the resulting nitric acid vapor and any water vapor incidentally evolved therewith to the dehydrating tower for passage in counter-current relation to the sulphuric acid going into the acid mixture.

4. In the operation of a nitric acid concentrator comprising a series of heated retort tubes and a dehyrating tower, the method which includes mixing the dilute nitric acid with sulphuric acid, passing the resulting acid mixture through the retort tubes in order to evolve nitric acid vapor, conducting the resulting nitric acid vapor and any water vapor incidentally evolved therewith to the dehydrating tower, externally heating at least a portion of the initially mixed nitric and sulphuric acids, and independently conducting the resulting nitric acid vapor and any water vapor incidentally evolved therewith to the dehydrating tower.

5. In the operation of a nitric acid concentrator comprising a series of heated retort tubes and a dehydrating tower, the method which includes mixing the dilute nitric acid with sulphuric acid in a body of liquid having a volume substantially greater than that of the liquid content in a retort tube in order to insure thorough mixing of the acids, externally heating at least a portion of the initially mixed nitric and sulphuric acids, conducting the resulting nitric acid vapor and any water vapor incidentally evolved therewith to the dehydrating tower, passing the acid mixture through the retort tubes in order to evolve nitric acid vapor, independently conducting the resulting nitric acid vapor and any water vapor incidentally evolved therewith to the dehydrating tower, and passing the vapor through the tower in countercurrent relation to the sulphuric acid going into the acid mixture.

6. A nitric acid separation or/and concentration system comprising a plurality of retort tubes, means to heat the retort tubes, a mixer chamber having a volume substantially greater than the volume of a retort tube connected to the retort tubes, and sulphuric acid and nitric acid supply tanks feeding into said mixer chamber.

7. A nitric acid separation or/and concentration system comprising a plurality of retort tubes connected in series, means to heat the retort tubes, a dehydrating tower, and a mixer chamber having a volume substantially greater than the volume of a retort tube connected between the retort tubes and the dehydrating tower.

8. A nitric acid separation or/and concentration system comprising a plurality of retort tubes connected in series and provided at their discharge ends with means for establishing the liquid levels therein, means to heat the retort tubes, a dehydrating tower, and a mixer chamber between the retort tubes and the dehydrating tower and having a volume substantially greater than the volume of a retort tube.

9. A nitric acid separation or/and concentration system comprising a plurality of retort tubes, a mixer chamber connected to the retort tubes and having a volume substantially greater than that of a retort tube, sulfuric acid and nitric acid supply tanks feeding into said mixer chamber, and means to heat the retort tubes and at least a portion of the mixer chamber.

10. A nitric acid separation or/and concentration system comprising a plurality of retort tubes connected in series, a dehydrating tower, a mixer chamber between the retort tubes and the dehydrating tower and having a volume substantially greater than that of a retort tube, and means to heat the retort tubes and at least a portion of the mixer chamber.

11. A nitric acid separation or/and concentration system comprising a plurality of retort tubes connected in series and provided at their discharge ends with means for establishing the liquid levels therein, a dehydrating tower, a mixer chamber between the retort tubes and the dehydrating tower and having a volume substantially greater than that of a retort tube, means to heat the retort tubes, and additional means to independently heat at least a portion of the mixer chamber.

12. A nitric acid separation or/and concentration system comprising a plurality of retort tubes connected in series, means to heat the retort tubes, a dehydrating tower, a mixer chamber connected between the retort tubes and the dehydrating tower and having a volume substantially greater than that of a retort tube, and means to facilitate the feed of nitric acid vapor from the retort tubes to the dehydrating tower.

13. A nitric acid separation or/and concentration system comprising a plurality of retort tubes connected in series, means to heat the retort tubes, a dehydrating tower, a mixer chamber connected between the retort tubes and the dehydrating tower and having a volume substantially greater than that of a retort tube, means to heat the mixer chamber, and means to facilitate the feed of nitric acid vapor from the retort tubes and mixer chamber to the dehydrating tower.

14. A separation or/and concentration system comprising a retort, a dehydrating tower, mixer means connected between the retort and the dehydrating tower, means to conduct vapor from the retort to the dehydrating tower, and means to independently conduct vapor from the mixer means to the dehydrating tower.

15. A separation or/and concentration system comprising a retort, a dehydrating tower, mixer means connected between the retort and the dehydrating tower, means to conduct vapor from the retort to the dehydrating tower, means to heat the mixer means, and means to independently conduct vapor from the mixer means to the dehydrating tower.

16. A nitric acid separation or/and concentration system comprising a plurality of retort tubes connected in series, means to heat the retort tubes, a dehydrating tower, a mixer chamber connected between the retort tubes and the dehydrating tower, means to conduct the nitric acid vapor from the retort tubes directly to the dehydrating tower, and means to conduct nitric acid vapor from the mixer chamber to the dehydrating tower independently of the feed of nitric acid vapor from the retort tubes to the dehydrating tower.

17. A nitric acid separation or/and concentration system comprising a plurality of retort tubes connected in series, means to heat the retort tubes, a dehydrating tower, a mixer chamber connected between the retort tubes and the dehydrating tower and having a volume substantially greater than that of a retort tube, means to conduct the feed of nitric acid vapor from the retort tubes directly to the dehydrating tower, and means to conduct nitric acid vapor from the mixer chamber to the dehydrating tower independently of the feed of nitric acid vapor from the retort tubes to the dehydrating tower.

18. A nitric acid separation or/and concentration system comprising a plurality of retort tubes connected in series, means to heat the retort tubes, a dehydrating tower, a mixer chamber connected between the retort tubes and the dehydrating tower, means to conduct the nitric acid vapor from the retort tubes directly to the dehydrating tower, means to heat the mixer chamber, and means to conduct nitric acid vapor from the mixer chamber to the dehydrating tower independently of the feed of nitric acid vapor from the retort tubes to the dehydrating tower.

19. A nitric acid separation or/and concentration system comprising a plurality of retort tubes connected in series and provided at their discharge ends with means for determining the liquid levels therein, means to heat the retort tubes, a dehydrating tower, a mixer chamber connected between the retort tubes and the dehydrating tower and having a volume substantially greater than that of a retort tube, means to conduct the nitric acid vapor from the retort tubes directly to the dehydrating tower, means to heat the mixer chamber, and means to conduct nitric acid vapor from the mixer chamber to the dehydrating tower independently of the feed of nitric acid vapor from the retort tubes to the dehydrating tower.

20. A nitric acid separation or/and concentration system comprising a plurality of retort tubes connected in series, a dehydrating tower, mixer means connected between the retort tubes and the dehydrating tower, means to conduct nitric acid vapor from the mixer means to the dehydrating tower, and a pipe bypassing the mixer means and connecting the retort tubes with the dehydrating tower.

Signed at Buffalo in the county of Erie and State of New York this 8th day of May A. D. 1930.

SAMUEL F. SPANGLER.